(12) United States Patent
Gay et al.

(10) Patent No.: US 8,924,477 B2
(45) Date of Patent: *Dec. 30, 2014

(54) REAL-TIME MEETING OBJECT EXTENSIBILITY

(75) Inventors: Jonathan Gay, Mill Valley, CA (US); Giacomo Guilizzoni, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 13/459,928

(22) Filed: Apr. 30, 2012

(65) Prior Publication Data

US 2014/0250435 A1    Sep. 4, 2014

Related U.S. Application Data

(63) Continuation of application No. 10/857,606, filed on May 27, 2004, now Pat. No. 8,190,679.

(51) Int. Cl.
*G06F 15/16* (2006.01)

(52) U.S. Cl.
USPC .......................................................... 709/204

(58) Field of Classification Search
CPC ............................... H04L 67/34; H04L 65/403
USPC .......................................................... 709/204
See application file for complete search history.

(56) References Cited

U.S. PATENT DOCUMENTS 6,018,346 A * 1/2000 Moran et al. ................... 715/863
6,772,137 B1 * 8/2004 Hurwood et al. ..................... 1/1

* cited by examiner

*Primary Examiner* — Maceeh Anwari
(74) *Attorney, Agent, or Firm* — Kilpatrick Townsend & Stockton LLP

(57) ABSTRACT

A system and method for sharing and installing customized meeting objects into an ongoing electronic meeting is disclosed. An object module, which defines the customized meeting object is loaded onto a server hosting the ongoing electronic meeting. Client-side portions of the object module are then downloaded to each of the clients that are participating in the electronic meeting. While the meeting is ongoing, the meeting player installs the client-side portions of the object module and displays the customized meeting object, at least, to a meeting presenter. Once displayed to a meeting presenter, the presenter may use the customized meeting object during the meeting and display such object to the meeting participants when desired.

13 Claims, 3 Drawing Sheets

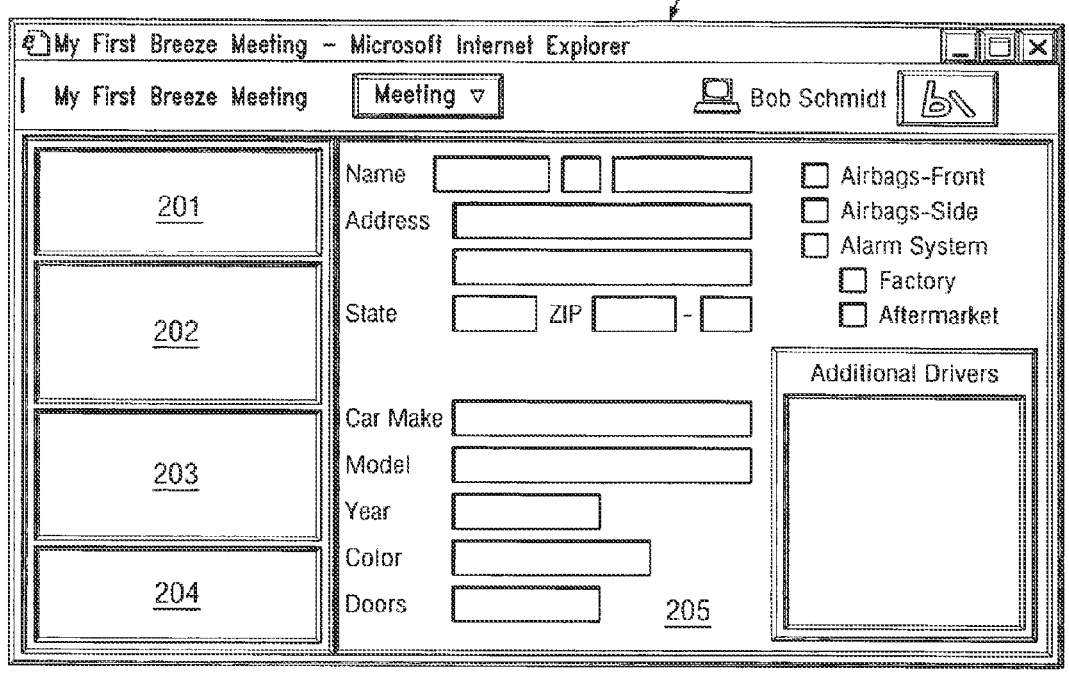
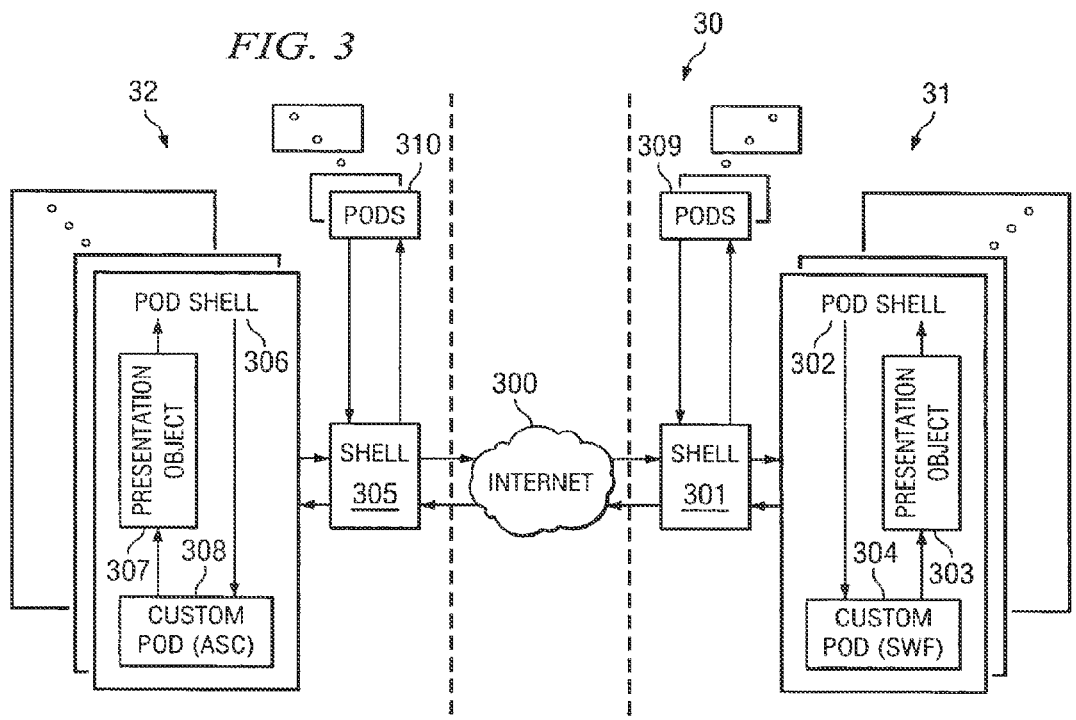

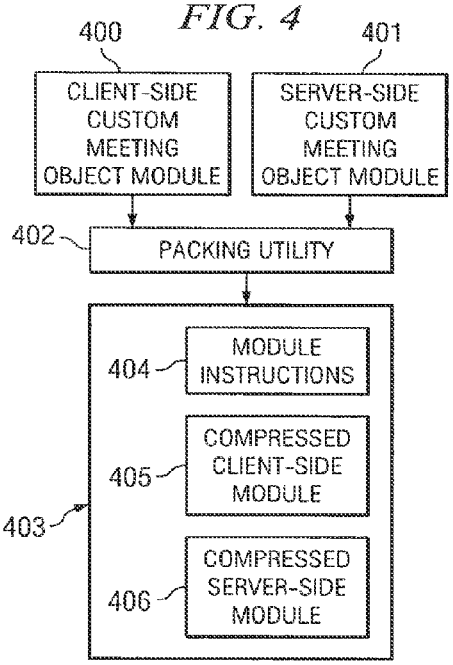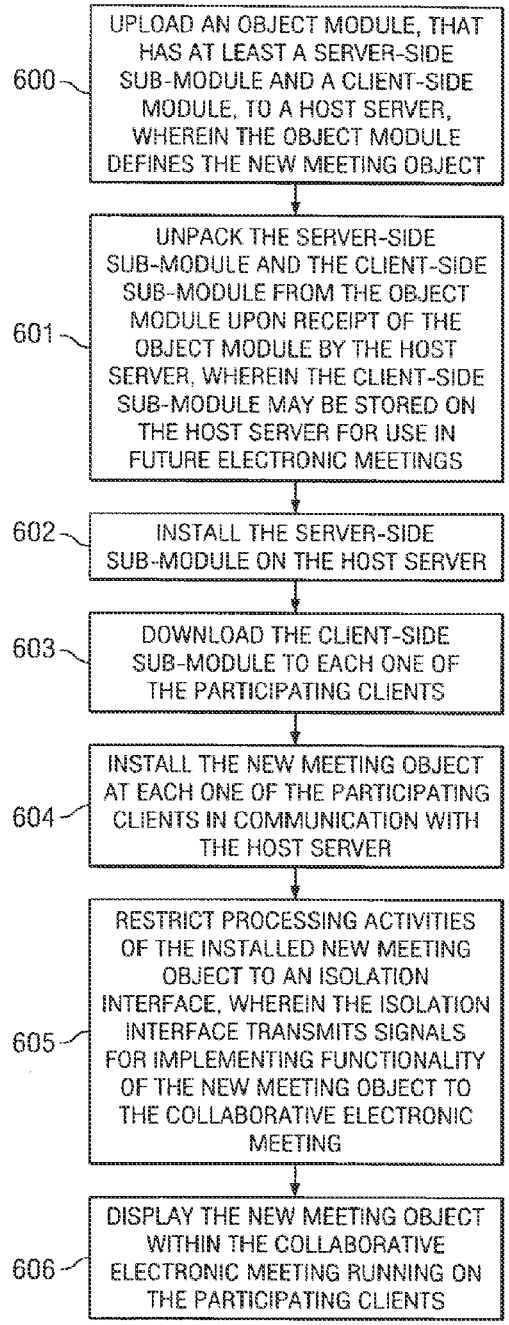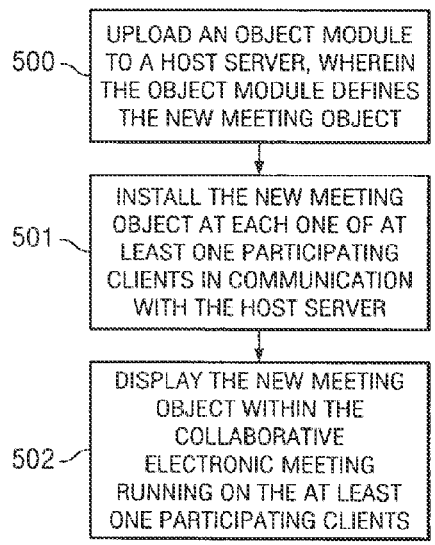

REAL-TIME MEETING OBJECT EXTENSIBILITY

This application is a continuation application of U.S. patent application Ser. No. 10/857,606, filed May 27, 2004. The entire contents of both applications are incorporated herein by reference.

TECHNICAL FIELD

The present invention relates, in general, to collaborative electronic meeting space, and, more specifically, to providing real-time extensibility of meeting objects.

BACKGROUND OF THE INVENTION

The first Internet was a communications system funded and built by researchers for military use. This Internet, originally known as ARPANET, was embraced by the research and academic communities as a mechanism for scientists to share and collaborate with other scientists. This collaborative network quickly evolved into the information superhighway of commerce and communication. The Internet explosion was due, in part, to the development of the World Wide Web (WWW) and graphically-based Web browsers, which facilitated a more graphically-oriented, multimedia system that uses the infrastructure of the Internet to provide information in a graphical, visual, and interactive manner that appeals to a wider audience of consumers seeking instant gratification.

As the technology underlying transmission bandwidth has grown in conjunction with the accessibility to such increasing transmission bandwidth, a new paradigm for the old idea of Internet collaboration is emerging that takes advantage of the modern graphical, visual world. This new paradigm is also driven by the advance in real-time or time-sensitive data transmission technology, such as Voice over Internet Protocol (VoIP) technology, and the like. Non-Internet videoconferencing, which has generally never been able to completely supplant teleconferencing as a viable means for reliable communications, is slowly fading away in favor of Internet-driven technology, such as collaborative electronic meetings. Services, such as WEBEX COMMUNICATIONS, INC.'S, WEBEX™ electronic meeting or collaboration services offer the ability for users to connect, at least initially, across the Internet to share voice, video, and data in real time for meetings, presentations, training, or the like.

In such collaborative meeting environments, a virtual meeting room typically is made up of several meeting objects which are generally containers for presentation information, such as slides, video, audio, documents, computer applications, and the like, that are themselves contained within the container of the meeting room. Other meeting objects may contain and display information concerning the meeting, such as the meeting participants, text communications made by the meeting participants, or the like. In current electronic meeting applications, these meeting objects are usually pre-existing segments of computer code that arc statically placed onto a form virtual meeting room. Except for the possibility of showing and hiding predefined objects, or of being capable of moving a meeting object to a different location on the virtual meeting room during an actual electronic meeting, customization of meeting objects is typically performed well in advance and installed into the electronic meeting application architecture with the help of the application owner. Moreover, existing electronic meeting applications offer no means for new meeting objects to be created and implemented during a live meeting. This lack of control reduces the flexibility of the modern electronic meeting applications,

BRIEF SUMMARY OF THE INVENTION

The various embodiments of the present invention are directed to a system and method for sharing customized meeting objects into a real-time electronic meeting. Pod developers may create a new meeting object or pod that performs a desired task or set of features or functions or display desired information. A pod or meeting object is a display sub-module that is displayed on the meeting interface. Each pod or object may display various different types of information, such as a video, slides, text, notes, and the like, and may also include logic to perform specific functions. These meeting objects or pods may be designed to look a particular way or be a particular size or even perform any variety of different functions. Because a meeting object or pod will be used not only on each of the meeting participant's computers or meeting interface units, but also on the server that is hosting the electronic meeting, the pod developers create a client-side meeting object module and a server-side meeting object module. The client-side modules are written in a file format that may be used by the client-side electronic meeting application. Conversely, the server-side modules are also written in a file format that may be run by the host server. The function of each local pod playing on the electronic meeting application may be directed or fed with information or data flowing from or being produced by the server-side pod application running on the host server. In the case of an online meeting, this information or data may originate on the client computer of a meeting presenter and/or viewer or meeting participant. the originating information would then be communicated to the host server, which disseminates it to the other participating client units.

In representative embodiments of the present invention, the pod developers may package both the client-side module and server-side module into a single archive file which may then he uploaded to the host server. After unpacking the archive file, the server installs the server-side module and signals each of the participating clients that a new meeting object is available. Each client would then signal to download the client-side module. The electronic meeting application operating on the participating client receives and installs the server-side module during an ongoing electronic meeting. As soon as the module is installed and the new meeting object establishes communication with the server-side module, the new meeting object may appear to the meeting participants on the electronic meeting canvas in real-time or, at least, become available to a meeting presenter for immediate display on the meeting canvas.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 2B is a screenshot illustrating an electronic meeting canvas having a new meeting object installed during art ongoing electronic meeting;

FIG. 3 is a block diagram illustrating an additional embodiment of the present invention for sharing new meeting objects in a live electronic meeting;

FIG. 4 is a block diagram illustrating a packaging system in an electronic meeting application configured according to another embodiment of the present invention for packaging server-side and client-side meeting object modules into a single meeting object module for a host server;

FIG. 5 is a flowchart illustrating example steps executed in implementing an embodiment of the present invention; and FIG. 6 is a flowchart illustrating example steps implementing an additional embodiment of the present invention.

DETAILED DESCRIPTION OF THE INVENTION

Figure 1:
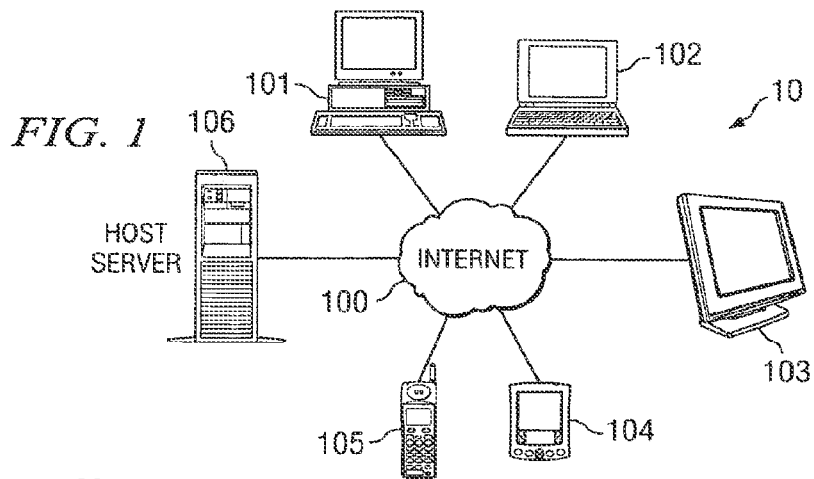
FIG. 1 is a block, diagram illustrating a collaborative electronic meeting space configured according to one embodiment of the present invention.

FIG. 1 is a block diagram illustrating collaborative electronic meeting space 10 configured according to one embodiment of the present invention. Electronic meeting space 10 is implemented over Internet 100. Each of participating clients 101-105 accesses electronic meeting space 10 through Internet 100 and establishes a connection with host server 106. The users at any one of participating clients 101-105 may be a presenter or merely a meeting participant. Each one would run an instance of an electronic meeting application which displays the meeting canvas and meeting objects or pods to the users. The meeting objects displayed on participating clients 101-105 receive data and information from host server 106. The data may originate from a meeting presenter or viewer/participant either by way of a pre-existing presentation file that the presenter uploads to host server 106 or by live data from the meeting presenter's screen in a screen share function. The data may also originate from host server 106, such as a list of participants, results of a poll or quiz, or the like.

In the embodiment depicted in FIG. 1, participating client 101 may be a meeting presenter, for example. The user at participating client 101 develops a customized meeting object to be added to the ongoing meeting within electronic meeting space 10. The presenter uploads the new meeting object or pod from participating client 101 to host server 106 via Internet 100. Host server 106 installs the server-side portion of the new meeting object and then pushes the client-side portion of the new meeting object to each of participating clients 102-105. Once installed by the electronic meeting application operating on participating clients 102-105, the new meeting object appears on the meeting canvas for each of the users to see and interact with.

Figure 2A:
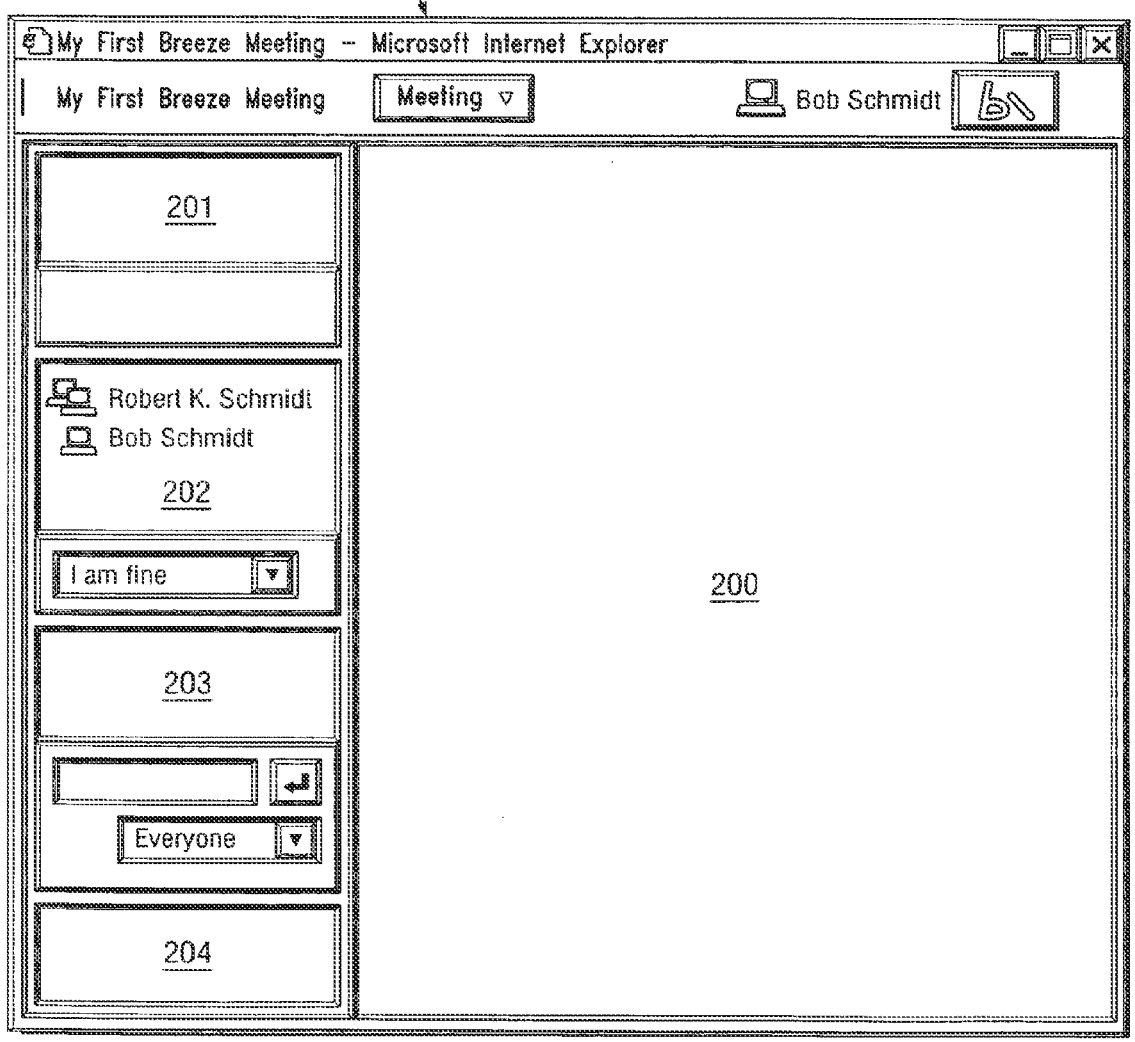
FIG. 2A is a screenshot illustrating an electronic meeting canvas displayed as a part of an electronic meeting application configured according to an embodiment of the present invention.

FIG. 2A is a screenshot illustrating electronic meeting canvas 20 displayed as a part of an electronic meeting application configured according to an embodiment of the present invention. Electronic meeting canvas 20 includes a number of meeting objects or pods, such as slides pod 200, camera and voice pod 201, attendee pod 202, chat pod 203, and notes pod 204. Electronic meeting canvas 20 operates much like an interactive multimedia runtime container (iMRC), such as MACROMEDIA INC.'s MACROMEDIA FLASH™ player, or a media player, such as MICROSOFT CORPORATION's WINDOWS™ MEDIA PLAYER, and the like. The meeting shell or canvas may also be implemented in a general purpose programming environment, such as SUN MICROSYSTEM INC.'S JAVA™, MICROSOFT CORPORATION'S WINDOWS 32™, and .NET™ CLR. Each of the pods is represented by a software module that is played by electronic meeting canvas 20 to display the visual makeup of the pod or meeting object along with its display data.

It should be noted that when implemented in iMRC technology, such as a MACROMEDIA FLASH™ player, electronic meeting canvas 20 may be displayed on one instance of an iMRC, while each of the contained meeting objects or pods may be rendered as independent objects on the same instance of the iMRC. This implementation allows for separate and independent communication streams to be established between each iMRC instance and an interactive multimedia communication server (iMCS), such as MACROMEDIA, INC.'s FLASH COMMUNICATION SERVER™ (FCS).

It should be noted that in some embodiments of the present invention, the code for interface components, such as buttons, check boxes, scroll bars, and the like may he excluded from the actual pod module or file, relying, instead on a run-time shared library (RSL) to supply the component code. The pod module or file would, therefore, contain references or calls to the RSL in order to generate the defined interface components. Additional or alternative embodiments of the present invention, however, may include the interface component code within the actual pod or meeting object module.

FIG. 2B is a screenshot illustrating electronic meeting canvas 20 having a new meeting object installed during an ongoing electronic meeting. For purposes of the description of the embodiment illustrated in FIG. 2B, the hypothetical electronic meeting is a meeting between an insurance agent and a potential insured. Application pod 205 was developed in order to assist an insured fill out a particular insurance form. The meeting presenter in this example scenario would be the insurance agent. When the agent receives the new meeting object module, he or she may first install it during an actual live electronic meeting with a potential insured. For purposes of this example, a meeting may have begun, as depicted in FIG. 2A, between the insured and the insurance agent. The insurance agent, now having the new meeting object of application pod 205, uploads the meeting object module to the host server, such as host server 106 (FIG. 1). The host server installs the server-side code for the new meeting object and pushes the client-side code for application pod 205 to the potential insured's computer. In push technology, a server typically issues a signal to a client that data on the server is available for download. Once the client receives this message, the client sends a download request to the server for that particular data. This signaling is typically implemented in the processing of the application. Therefore, a user is generally unaware that such signaling is occurring.

During the meeting, the insurance agent may be broadcasting voice and video through camera and voice pod 201 and possibly sending chat messages through chat pod 203. The underlying electronic meeting application running electronic meeting canvas 20 and each of the displayed meeting objects installs the code for application pod 205. Once installed, application pod 205 is available for the insurance agent to bring onto electronic meeting canvas 20, as it is shown in FIG. 2B. As application pod 205 is brought onto electronic meeting canvas 20, the information and data being shared in camera and voice pod 201, attendees pod 202, chat pod 203, and notes pod 204 continues to be shown without interruption.

The hypothetical functionality of application pod 205 allows both the insurance agent and the potential insured to fill out an insurance form together, even though both may be in locations remote to each other. This functionality would be useful for each such electronic meeting for this insurance product or insurance company. Therefore, in additional or alternative embodiments of the present invention, once the server-side code for the new meeting object has been installed and a copy of the client-side code saved onto the host server, every other meeting established by this particular insurance company may access application pod 205 for future meetings. Thus, the new object module is installed once in order to be available for future electronic meetings.

FIG. 3 is a block diagram illustrating an additional embodiment of the present invention for sharing new meeting objects in live electronic meeting 30. FIG. 3 shows a single connection between participant client 31 and hosting server 32 over Internet 300. Additional clients may be in communication with hosting server 32 in order to attend a multiparty electronic meeting. However, for purposes of FIG. 3, only the connection between participant client 31 and hosting server 32 is shown. The electronic meeting application running on participant client 31 and hosting server 32 manage live electronic meeting 30. On the client-side, electronic meeting application includes shell 301, which is the backbone of the electronic, online meeting system. Shell 301 handles all the windowing, the loading of the various pods or meeting objects, and manages all of the client-to-server communication. Similarly, on the server side, shell 305 manages the same types of features and functions on the server side of the meeting.

The electronic meeting application comes with a variety of pre-built pods, pods 309, which represent normal, generic meeting objects or pods, such as slides pod 200 (FIG. 2A), camera and voice pod 201 (FIG. 2A), and the like. The generic meeting objects are installed as pods 309 on the client-side of the electronic meeting application, participant client 31, and as pods 310 on the server-side, hosting server 32. One consideration that is made in allowing custom meeting objects into live electronic meeting 30 is security. If no security considerations are made, it may be possible for a custom meeting object module to be created that disrupts or crashes the meeting, or, worse, possibly infect the clients and servers with a virus or other such undesirable software. The embodiment of the present invention shown in FIG. 3 is constructed with security measures taken to insulate the inner workings of live electronic meeting 30 from a custom meeting object, such as custom pod 304 (on participant client 31) and it's server-side counterpart, custom pod 308.

Instead of installing custom pod 308 directly into the electronic meeting application on participant client 31, a new pod type is defined within the electronic meeting application to interact specifically with customized pods. This custom pod type, pod shell 302, acts as a container for custom pod 304 and limits custom pod 304's communication with shell 301 and the electronic meeting application on hosting server 32. Pod shell 302 acts like an isolation interface, isolating the processing activities of custom pod 304. Pod shell 302 maintains two-way communications with shell 301 for managing the calls to hosting server 32 and the server-side counter part, custom pod 308.

When a new, custom pod is uploaded, shell 301 causes a new instance of the new pod type to be formed, pod shell 302. Pod shell 302 creates an intermediary object, presentation object 303, which accepts API calls from custom pod 304, but which is controllable by pod shell 302 should custom pod 304 become unstable or attempts to disrupt the meeting. Custom pod 304 is installed within the container of pod shell 302 and is able to make application programming interface (API) calls only to presentation object 303. Presentation object 303 is also limited to make API calls only to pod shell 302. In turn, pod shell 302 may make API calls directly to custom pod 304. With this architecture, custom pod 304 is sufficiently isolated from the inner workings of the electronic meeting application running live electronic meeting 30 on participant client 31.

In operation, the meeting participant may activate some interface component on the new meeting object defined by custom pod 304. Shell 301 communicates this API call to pod shell 302. Pod shell 302 makes the API call directly on custom pod 304. Custom pod 304 makes the API call to presentation object 303, which, in turn, calls on pod shell 302. Pod shell 302 makes a server call to shell 301, which communicates the call over Internet 300 to server-side shell 305. Server-side shell 305 makes its API call on pod shell 306, which makes an API call on the server-side counterpart, custom pod 308. When the processing of custom pod 308 returns responsive data, or a result, the data or result is communicated to presentation object 307, which communicates the data to pod shell 306. Pod shell 306 communicates the data to server-side shell 305, which transmits the data over Internet 300 to shell 301. Shell 301 may either render the data onto the new meeting object directly or may deliver the data to custom pod 304 through pod shell 302. If processing is done at custom pod 304, the results may be delivered back to shell 301 for rendering, through presentation object 303 and pod shell 302. Thus, custom pod 304 is isolated from direct communication with the main components of the electronic meeting application. If custom pod 304 attempted to make an invalid API call to presentation object 303, presentation object 303 would not understand the call, which would go unanswered. Similarly, because custom pod 304 is only allowed to make API calls on presentation object 303, if a call were attempted on pod shell 302 or shell 301 from custom pod 304, it would similarly go unanswered.

It should be noted that various embodiments of the present invention may implement live electronic meeting 30 using existing iMCS technology, such as MACROMEDIA, FCS, and existing iMRC technology, such as the MACROMEDIA FLASH™ player. When created using such FCS and MACROMEDIA FLASH™ player technology, it should be noted that custom pod 304 would be a Small Web File (SWF) format, which is the native format for the MACROMEDIA FLASH™ player. Custom pod 308 would then be an ActionScript for Communication (ASC) file format, which is one of the native formats for the FCS. Other technologies with similar functionality, such as a dynamic link library (DLL) file, a JAVA™ class file, and/or a CLR assembly, may be used to implement the various embodiments of the present invention.

FIG. 4 is a block diagram illustrating a packaging system in an electronic meeting application configured according to another embodiment of the present invention for packaging server-side and client-side meeting object modules into a single meeting object module for a host server. In order to develop a new or customized meeting object or pod, a developer codes server-side module 401, which contains the server script or code to communicate the functionality of the new meeting object to each of the participating clients, and client-side module 400, which contains the code for defining the appearance and functional interface of the new object. For example, if operating using the systems noted above, server-side module 401 may be an ASC file type to be run on an FCS server. Similarly, client--side module 402 may be a SAT file format to play on a presentation canvas implemented using an instance of the MACROMEDIA FLASH™ player. The new meeting object will not operate unless server-side module 401 is installed onto the host server and client-side module 400 is installed on each of the participating clients. Instead of uploading each of server-side module 401 and client-side module 400 separately to the host server, the embodiment of the present invention depicted in FIG. 4 creates meeting object extension 403 that combines server-side module 401 and client-side module 400 into a single file.

A meeting object developer may input client-side module 400 and server-side module 401 into packing utility 402. Packing utility 402 compresses client-side module 400 into compressed client-side module 405 and compresses server-side module 401 into compressed server-side module 406. Compressed modules 405 and 406 are then wrapped into an extension file with the addition of module instructions 404. Module instructions 404 is a set of server instructions that direct the host server what to do with meeting object extension 403, including how to unpack and install server-side module 401.

It should be noted that in additional and/or alternative embodiments of the present invention, meeting object extension 403 may not include module instructions 404. In such embodiments, the server automatically knows how to handle the other objects within meeting object extension 403.

After the host server installs unpacked server-side module 401, a signal may be sent by the host server to each participating client indicating that a new meeting object is available. This signal is sent to the electronic meeting application running on each participating client system. A user is unaware that any such signaling occurs with the host server regarding a new meeting object. The electronic meeting application for each of the participating clients then requests to download the client-side module 400 from the host server. Once client-side module 400 is downloaded, electronic meeting application begins running the client-side code for implementing the new meeting object on the presentation screen. The electronic meeting application maintains an open connection to the host server and is able to begin running a presentation instance for the new meeting object at the same time that the rest of the meeting is still running.

A related technology that utilizes a packaged set of files for installation onto a server is SUN MICROSYSTEMS, INC.'s JAVA™ ARCHIVE (JAR) files. The JAR file format consolidates multiple files into a single archive file, which contains JAVA™ classes and other auxiliary files, such as property files. These multiple files are compress using a ZIP compression algorithm. The compression of the files assists in distributing applications across a network. However, while this style of archiving, as in the JAR files, has been practiced, the selected embodiments of the present invention which utilize the packaging system is distinctive. Because JAR files are intended to run with JAVA™-based application servers, which run with a Web browser, the client cannot utilize the application and information within the JAR file without first refreshing the page. In contrast, the embodiments of the present invention that utilize a packaging technique operate in real-time, such that as the electronic meeting is operating, the server and clients may download and install the packaged files or applications.

FIG. 5 is a flowchart illustrating example steps executed in implementing an embodiment of the present invention. In step 500, an object module is uploaded to a host server, wherein the object module defines the new meeting object. The object module may come from a meeting participant who is a presenter in the electronic meeting or from a mere participant. In step 502, the new meeting object is installed at each one of the participating clients in communication with the host server. The new meeting object is displayed in step 503 within the collaborative electronic meeting running on the participating clients.

FIG. 6 is a flowchart illustrating example steps implementing an additional embodiment of the present invention. In step 600, an object module, that has at least a server-side sub-module and a client-side module, is uploaded to a host server, wherein the object module defines the new meeting object. The server-side sub-module and the client-side sub-module are unpacked from the object module upon receipt of the object module by the host server, in step 601, wherein the client-side sub-module may be stored on the host server for use in future electronic meetings. The server-side module is then installed on the host server in step 602. The client-side sub-module is downloaded, in step 603, and installed, in step 604, to each of the participating clients in communication with the host server. The processing activities of the installed new meeting object are restricted to an isolation interface, in step 605, wherein the isolation interface transmits signals for implementing functionality of the new meeting object to the collaborative electronic meeting. In step 606, the new meeting object is displayed within the collaborative electronic meeting running on the participating clients.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer implemented method comprising:
receiving, at a server comprising a processor and memory, hosting an ongoing electronic meeting, from one of a plurality of participants of the ongoing electronic meeting, executable server-side code previously unexecuted in the meeting and executable client-side code previously unexecuted in the meeting, the client-side code executable by the participants to provide a custom client-side meeting pod and the server-side code executable by the server to provide a corresponding custom server-side meeting pod;
installing, during said ongoing electronic meeting, server instructions from the server-side code, wherein said server instructions extend functionality of the server so that the server supports a custom meeting object;

transmitting, during said ongoing electronic meeting, client instructions from the client-side code to remaining ones of said plurality of participants of said ongoing electronic meeting, wherein said client instructions define client functionality of said custom meeting object;

wrapping said server instructions into a server communication object;

wrapping said client instructions into a client communication object;

restricting communications of said server instructions to said server communication object;

restricting communications of said client instructions to said client communication object; and establishing communication between said server communication object and said client communication object for implementing said custom meeting object.

2. The method of claim 1 further comprising:

extracting said server instructions from said server-side code and said client instructions from said client-side code prior to installing.

3. The method of claim 1 further comprising:

responsive to said installing, signaling said remaining ones of said plurality of participants to download said client instructions.

4. A computer implemented method comprising:

hosting, at a server comprising a processor and memory, an electronic meeting by communicating with a plurality of instances of a client-side meeting application, and while the electronic meeting continues:

receiving, at the server, from one of the instances of the client-side application, executable server-side code previously unexecuted in the meeting and executable client-side code previously unexecuted in the meeting, the client-side code executable by the instances of the client-side meeting application to provide a custom client-side meeting pod and the server-side code executable by the server to provide a corresponding custom server-side meeting pod that extends the functionality of the server;

in response to receiving the executable server-side code and the executable client-side code, installing the executable server-side code at the server and providing the executable client-side code to at least one of the instances of the client-side meeting application;

running the installed server-side code to provide data to an instance of the client-side meeting application;

wrapping said server-side code into a server communication object;

wrapping said client-side code into a client communication object;

restricting communications of said server-side code to said server communication object;

restricting communications of said client-side code to said client communication object; and establishing communication between said server communication object and said client communication object for implementing said custom meeting object.

5. The method set forth in claim 4, wherein hosting comprises maintaining a server-side shell that routes API calls from client-side meeting pods to corresponding server-side meeting pods, and wherein installing comprises installing the custom server-side meeting pod so that the custom server-side meeting pod is restricted from directly providing an API call to the server-side shell.

6. The method set forth in claim 5, wherein the custom server-side meeting pod is restricted from directly providing the API call by installing the custom server-side meeting pod within a pod shell, the custom-server side meeting pod limited to making API calls to a custom presentation object that is controlled by the pod shell.

7. The method set forth in claim 6, wherein the custom client-side meeting pod comprises a file executable by a runtime container and the corresponding custom server-side meeting pod comprises a server script or code package processed by the server to cause the server to communicate with the file executable by the runtime container.

8. The method of claim 4, wherein:

the plurality of instances of client-side meeting application are executed at client computing devices, but not at the server, the server-side code is installed and run at the server, but not the client computing devices, and the client-side code and client-side meeting pods are run at the client computing devices, but not the server.

9. The method of claim 8, wherein extending the functionality of the server comprises causing the server to provide support for the custom client- side meeting pod during the meeting, the server incapable of providing support for the custom client-side meeting pod prior to having its functionality extended.

10. A non-transitory computer readable medium comprising program code executable by a processor, the program code configured to cause a computing system comprising the processor and a memory to:

host, as a server, an electronic meeting by communicating with a plurality of instances of a client-side meeting application;

receive, while the meeting is ongoing, from one of the instances of the client-side application, executable server-side code previously unexecuted in the meeting and executable client-side code previously unexecuted in the meeting, the client-side code executable by the instances of the client-side meeting applications to provide a custom client-side meeting pod and the server-side code executable by the server to provide a corresponding custom server-side meeting pod that extends the functionality of the server;

in response to receiving the executable server-side code and the executable client-side code, install the executable server-side code at the server and provide the executable client-side code to at least one of the instances of the client-side meeting application;

run the installed server-side code to provide data to an instance of the client-side meeting application executing the client-side code;

wrap said server-side code into a server communication object;

wrap said client-side code into a client communication object;

restrict communications of said server-side code to said server communication object;

restrict communications of said client-side code to said client communication object; and establish communication between said server communication object and said client communication object for implementing said custom meeting object.

11. The computer readable medium set forth in claim 10, wherein hosting comprises maintaining a server-side shell that routes API calls from client-side meeting pods to corresponding server-side meeting pods, and wherein installing comprises installing the custom server-side meeting pod so that the custom server-side meeting pod is restricted from directly providing an API call to the server-side shell.

12. The computer readable medium set forth in claim 11, wherein the custom server-side meeting pod is restricted from directly providing the API call by installing the custom server-side meeting pod within a pod shell, the custom-server side meeting pod limited to making API calls to a custom presentation object that is controlled by the pod shell.

13. The computer readable medium set forth in claim 12, wherein the custom client-side meeting pod comprises a file executable by a runtime container and the corresponding custom server-side meeting pod comprises a server script or code package that causes the server to communicate with the file executable by the runtime container.

* * * * *

UNITED STATES PATENT AND TRADEMARK OFFICE
CERTIFICATE OF CORRECTION

| | | |
|---|---|---|
| PATENT NO. | : 8,924,477 B2 | Page 1 of 2 |
| APPLICATION NO. | : 13/459928 | |
| DATED | : December 30, 2014 | |
| INVENTOR(S) | : Jonathan Gay et al. | |

It is certified that error appears in the above-identified patent and that said Letters Patent is hereby corrected as shown below:

In the Specification

Column 3 beginning at Line 63

Insert

--pod from participating client 101 to host server 106 via Internet 100. Host server 106 installs the server-side portion of the new meeting object and then pushes the client-side portion of--

Column 4, beginning at Line 63

Insert

--available for download. Once the client receives this message, the client sends a download request to the server for that particular data. This signaling is typically implemented in--

Column 7, beginning at Line 63

Insert

--the packaging system is distinctive. Because JAR are intended to run with the JAVATM-based application servers, which run with a Web browser, the client cannot utilize the--

Signed and Sealed this
Fifth Day of May, 2015

Michelle K. Lee
*Director of the United States Patent and Trademark Office*

CERTIFICATE OF CORRECTION (continued)
U.S. Pat. No. 8,924,477 B2

In the Claims

Column 8, Claim 1, at line 62

Delete

"cli-"

Insert

--client-side meeting pod and the server-side code executable by the server to provide a corresponding custom server-side meeting pod;--